UNITED STATES PATENT OFFICE.

CARL BENNERT, OF COEPENICK, NEAR BERLIN, GERMANY, ASSIGNOR, BY MESNE ASSIGNMENTS, TO THE CHEMICAL FOUNDATION, INC., A CORPORATION OF DELAWARE.

METHOD OF CLEANSING WITH ALKALI SALTS OF PROTALBINIC AND LYSALBINIC ACIDS.

1,367,007.  Specification of Letters Patent.  Patented Feb. 1, 1921.

No Drawing.  Application filed December 27, 1915. Serial No. 68,847.

*To all whom it may concern:*

Be it known that I, CARL BENNERT, a subject of the Emperor of Germany, and residing at Coepenick, near Berlin, in the Empire of Germany, have invented certain new and useful Improvements in Method of Cleansing with Alkali Salts of Protalbinic and Lysalbinic Acids, of which the following is a specification.

The present invention relates to a new and improved method of washing or cleansing. It has been known for some time, that proteins of animal or vegetable origin dissolved in a weak alkali hydrate or other caustic-acting solution are split hydrolytically by heat, so that nitrogen in the form of ammonia is given off and acids are produced which form salts with the alkalis. Such acids, of which the protalbinic acid and lysalbinic acid are the typical representatives have been first prepared and investigated by Paal; see *Berichte der Deutsche Chem. Gessellschaft*, vol. 35, page 2195.

I have found, that the solutions of these different acids and their alkali salts, which are formed from proteins accompanied by a loss of nitrogen in form of ammonia by heating the solutions of the proteins in a weak alkali hydrate or other caustic-acting solution, have more or less good washing and cleansing properties, so that they can be employed as a substitute for soap, which they even surpass as regards protecting the textile fibers from wear and tear. That property is specially exhibited when woollen fabrics are washed or cleansed, inasmuch as the fibers or yarns remain soft and brilliant and are moreover strongly protected from injury.

When using the new washing preparation the formation of froth is quite insignificant and the good result is not attained hereby. For instance, the mixture of sodium caseo-protalbinate and caseo-lysalbinate obtained from casein in the manner described above is a splendid preparation for washing wool or woolen fabrics although practically no frothing takes place, which is so characteristic for soapsuds.

In utilizing that property of the washing preparation according to the invention there is no need to separate or purify the different compounds formed. It is only necessary to neutralize the excess of alkali hydrate used by the addition of any suitable acid until the reaction is neutral with phenol-phthalein. For some purposes it is preferable to remove the alkali hydrate by dialysis, whereby any loss of substance is avoided, since the dialyzed substance can be used over again.

The solutions thus obtained, chiefly consisting of the derivatives of the proteins which correspond with the typical protalbinic and lysalbinic acid, may be boiled down in a vacuum and can be applied in a concentrated state or may be evaporated to dryness.

The products can also be mixed with other known products commonly used for washing purposes in order to modify and influence their properties. By that mixture I obtain preparations of variable properties for washing and cleansing.

I will now explain by way of example how to clean dirty woolen goods by means of the new washing preparation. I take for 250 gr. of wool about 20 gr. of the neutral dry washing agent, obtained as described above and boiled down to dryness in a vacuum. That quantity of the preparation is dissolved in about one liter of water of 30° to 35° C. The goods to be cleansed are well soaked with that solution and allowed to rest for about half an hour or longer, a certain length of time being essential for a good result. I then add about five to six times as much warm water of 30°–35° C. and the goods are repeatedly drawn through the liquor and squeezed out several times in order to remove the dirt which has become loose by allowing the goods to remain in the strong solution. After resting for some further time in the liquor the goods are first rinsed with fresh lukewarm water and finally with cold water. Scrubbing of the goods should be avoided as much as possible as otherwise they are liable to shrink and become like felt. For the same reason it is advisable to avoid much wringing of the goods which are preferably allowed to drain by hanging until they are perfectly dry. By that treatment woolen goods get perfectly clean and do not felt, but remain open and elastic, the wool keeping bright and soft and the colors do not suffer but are rather vivified.

Having now described my invention, what I consider new and wish to claim and to protect by Letters Patent of the United States is:—

1. The method of cleansing which comprises subjecting the material to be cleansed to the action of alkali salts of protalbinic and lysalbinic acids.

2. The method of cleansing which comprises subjecting the material to be cleansed to the action of alkali salts of caseo-protalbinic and caseo-lysalbinic acids.

3. The method of cleansing which comprises subjecting the material to be cleansed to the action of sodium salts of protalbinic and lysalbinic acids.

4. The method of cleansing which comprises subjecting the material to be cleansed to the action of sodium salts of caseo-protalbinic and caseo-lysalbinic acids.

In testimony whereof I affix my signature in presence of two witnesses.

CARL BENNERT.

Witnesses:
HENRY HASPER,
ARTHUR SCHROEDER.